United States Patent [19]

Wang et al.

[11] Patent Number: 5,182,249
[45] Date of Patent: Jan. 26, 1993

[54] NON-PRECIOUS METAL THREE WAY CATALYST

[75] Inventors: Ren Wang; Shanliang Wu; Zhigang Zhang, all of Shanghai, China

[73] Assignee: East China University of Chemical Technology, Shanghai, China

[21] Appl. No.: 651,087

[22] Filed: Feb. 6, 1991

[30] Foreign Application Priority Data

Oct. 22, 1990 [CN] China .................................. 90102964

[51] Int. Cl.$^5$ ...................... B01J 23/10; B01J 23/26; B01J 23/34

[52] U.S. Cl. .................................... 502/303; 502/302; 502/304; 502/324; 502/337; 502/338; 502/344; 502/355; 502/524; 502/525; 423/213.2; 423/213.5

[58] Field of Search ............... 502/303, 302, 304, 324, 502/337, 338, 344, 355, 524, 525; 423/213.2, 213.5

[56] References Cited

U.S. PATENT DOCUMENTS

| | | | |
|---|---|---|---|
| 3,226,340 | 12/1965 | Stephens et al. | 252/465 |
| 3,259,453 | 7/1966 | Stiles | 23/2 |
| 3,284,370 | 11/1966 | Clifford et al. | 252/462 |
| 3,322,491 | 5/1967 | Barrett et al. | 23/2 |
| 3,819,535 | 6/1974 | Huba et al. | 252/462 |
| 3,893,949 | 7/1975 | Sakai et al. | 252/454 |
| 3,899,444 | 8/1975 | Stephens | 252/455 |
| 3,929,670 | 12/1975 | Kudo et al. | 252/455 |
| 3,939,103 | 2/1976 | Belliot et al. | 252/455 R |
| 4,035,263 | 7/1977 | Umemura et al. | 252/459 |
| 4,221,768 | 9/1980 | Inoue et al. | 423/213.2 X |
| 4,407,735 | 10/1983 | Sawamura | 502/10 |
| 4,581,343 | 4/1986 | Blanchard et al. | 502/241 |
| 4,780,445 | 10/1988 | Jung | 502/217 |
| 4,859,433 | 8/1989 | Pereira et al. | 423/213.5 X |
| 4,927,799 | 5/1990 | Matsumoto et al. | 502/303 |
| 4,985,387 | 1/1991 | Prigent et al. | 502/303 X |

OTHER PUBLICATIONS

Chinese Patent Application No. CN 85 1 09694 B, 15 pages.
Journal of East China Institute of Chemical Technology, Publication No. 3, 1981, 21 pages.
Journal of East China Institute of Chemical Technology, Publication No. 4, 1988, 7 pages.
Journal, Environmental Chemistry, vol. 8, Feb., 1989, 7 pages.
Journal, Environmental Chemistry, vol. 8, No. 1, Feb., 1989, 6 pages.

Primary Examiner—W. J. Shine
Attorney, Agent, or Firm—Pennie & Edmonds

[57] ABSTRACT

A non-precious metal three-way catalyst which reduces hydrocarbon, carbon monoxide, and nitrogen oxide from internal combustion engine exhaust and industrial emissions, with a conversion capability comparable to the conversion efficiencies of current precious metal catalysts, and with superior $NO_x$ conversion characteristics, and durable when operated under prolonged high temperature conditions. The light-off temperature is close to the light-off temperature of conventional precious metal catalysts. The active catalytic components in this catalyst are a mixture of rare-earth metal and non-noble metal oxides.

5 Claims, No Drawings

NON-PRECIOUS METAL THREE WAY CATALYST

BACKGROUND OF THE INVENTION

The present invention relates to a non-noble metal combustion catalyst for reduction of carbon monoxide, hydrocarbons, and nitrous oxides from the exhaust gases of internal combustion engines and industrial vapor emissions.

Internal combustion engines are a primary power source for numerous applications. However, combustion by-products carried by their exhaust gas, primarily hydrocarbons, carbon monoxide and nitrous oxides, have undesired effects upon the environment. Similarly, noxious by-products from various manufacturing processes such as paint production can have damaging environmental effects. One common method to remove these pollutants is a catalytic converter through which the engine exhaust or industrial vapor flows before being expelled into the atmosphere. These converters, although of many specific constructions, generally consist of a mixture of one or more noble metals, such as palladium, rhodium, or platinum, disposed in one or more layers on porous substrate. Platinum and palladium are used primarily for oxidation reactions to remove hydrocarbons and carbon monoxide, while rhodium acts as a main catalytic active element for nitrous oxide reduction.

In specific, in a automobile exhaust converter, the nitrogen oxide ($NO_x$) may be reduced according to the following reactions:

$$2NO_x + 2XCO \rightarrow N_2 + 2XCO_2 \qquad (1)$$

$$2NO_x + 2XH_2 \rightarrow N_2 + 2XH_2O \qquad (2)$$

It is well known that the reaction (2) is a more efficient means for reduction of $NO_x$. If the reduction of $NO_x$ follows the reaction (2), the conversion efficiency of $NO_x$ may be dramatically increased. However, the main reaction follows reaction (1) route when conventional noble metal three way converters are used (reference to W. C. Hecker and R. B. Breneman, "The Effect of Weight Loading and Reduction Temperature on Rh/Silicon Catalysts for NO Reduction by CO"; F. C. M. J. M. Van Delft et al., "An AES Investigation of the Reactivity of Pt, Rh, and Various Pt-Rh Alloy Surfaces Towards $O_2$, NO, Co, and $H_2$"; P. W. Goodman et al., "Mechanisms of Carbon Monoxide Oxidation and Nitric Oxide Reduction Reaction Over Single Crystal and Supported Rhodium Catalysts: High Pressure Rate Explained Using Ultrahigh Vacuum Surface Science").

An inherent problem with noble metal catalytic converters is that an increasing scarcity of noble metals increases their cost and, moreover, the decreasing supply cannot indefinitely keep up with demand. In order to solve the foregoing difficulties, various non-noble metal catalysts have been proposed as replacements for the noble metal catalysts. However, none of these non-noble metal catalysts possess adequate catalytic action necessary to meet modern anti-smog requirements and they are unable to stand the heavy load of space velocity encountered. Also, since modern engines possess very high exhaust temperatures, the low thermal stability of the prior art non-noble metal catalytic converters significantly reduces their working life. The low thermal stability of the prior art non-noble converter is due in part to their susceptibility to temperature induced sintering and recrystallization, which effects the reduction of the ratio of catalyzing surface area to catalyst weight. Furthermore, at high temperatures some non-noble metal oxides can react with one another to form inactive compounds which serve no useful purpose.

In short, none of the non-noble metal catalysts of prior art possess an adequate combination of good three-way catalytic activity, the capability to endure the load of high space velocity, low ignition temperature, high thermal resistance, and strong mechanical strength. Moreover, none exhibit the necessary working life to be economical replacements for current noble metal catalytic converters.

Examples of the prior art non-noble metal catalysts are described in U.S. Pat. Nos. 3,956,189 and 3,914,389. These patents teach oxides of metals such as copper, cobalt, and manganese deposited on various conventional carries, or teach specified compounds such as lanthanum copper manganese oxide, without a carrier.

Also, U.S. Pat. Nos. 4,637,995; 3,498,927; 4,631,268, and U.K. Patent Publication No. 2,012,616 describe monolithic support structures of various types as potential carriers for various metal-containing catalysts. However, these catalyst all suffer from shortcomings which render them inadequate and impractical. Namely, the shortcomings include the thermal instability discussed hereinabove, high minimum catalyzing or igniting temperature, and low space velocity requirement. Furthermore, these prior art non-noble metal catalysts do not convert nitrous oxide so as to achieve three way catalys operation.

Some of these prior art monolithic catalyst supports provide a high surface area carrier phase as an integral discontinuous phase with the ceramic matrix itself. Lachman (U.S. Pat. No. 4,631,267) and De Angelis (U.S. Pat. No. 4,637,995) teach such a process and material. The Lachman references state that if solid starting materials are used, it is necessary to well mix the materials before forming the final product. Many mixing procedures are time-consuming and require specialized equipment.

SUMMARY OF THE INVENTION

The present invention, by using a novel combination of metal oxides and rare earth metal oxides, instead of noble metals, solves the cost and supply problems of noble metal converters and overcomes the deficiencies of prior art non-precious metal converters. Furthermore, the catalyst in this invention provides excellent HC and CO reduction, with superior $NO_x$ conversion capabilities. Still furthermore, the catalyst in this invention exhibits excellent temperature stability, being able to operate in temperatures up to 1000° C. without the loss of catalytic function or activity.

The present invention comprises a ceramic material as a first carrier, a second carrier comprising a mixture of metallic oxides stabilized by oxides of lanthanide elements disposed on or impregnated into the first carrier, and a catalytically active layer comprising a mixture of metallic oxides and oxides of rare earth metals disposed on or impregnated into the second carrier to form together into a highly catalytically active structure. In specific, a coating including the second carrier and a catalytically active layer is composed of oxides of rare earth metals and other non-noble metals selected from the group shown in Table I below, in relative weight ratio amounts indicated. The given weight ratio of any oxide can be converted to the percentage of total catalyst oxide weight which the subject oxide comprises by dividing the subject oxide's weight ratio by the sum of the subject oxide's weight ratio and all remaining constituent oxide weight ratios.

TABLE I

A. Metallic Oxides Within Oxide Coating (by Weight Ratio)

The following oxides of aluminum, manganese, cobalt, nickel and potassium must be present, within the indicated weight ratio: $Al_2O_3$ (between 2 and 50), $MnO_2$ (between 1 and 6), $Co_2O_3$ (between 1 and 4), $NiO$ (between 1 and 5), and $K_2O$ (between 0.5 and 1).

At least one of the following oxides of copper, vanadium, chromium, molybdenum, tungsten, niobium, tantalum, iron, titanium, and zinc, by an amount within the indicated weight ratio, must be present: $CuO$ (up to 20), $V_2O_5$ (up to 3), $Cr_2O_3$ (up to 1), $MoO_3$ (up to 2), $WO_3$ (up to 2.5 ), $Nb_2O_3$ (up to 4), $Ta_2O_5$ (up to 2), $Fe_2O_3$ (up to 2), $TiO_2$ (up to 1), $ZnO$ (up to 2), $BaO$ (up to 2).

B. The Oxides of Rare Earth Metals Within Oxide Coating (by weight ratio)

The following oxides of lanthanum, cerium, and yttrium, by the indicated weight ratio, must be present: $La_2O_3$ (between 1 and 5), $CeO_2$ (between 0.5 and 10), and $Y_2O_3$ (between 0.05 and 6). At least one of the following rare earth oxides, by an amount within the indicated weight ratio, must be present to provide increased stability within the catalytic layer: $Pr_2O_3$ (up to 3), $Nd_2O_3$ (up to 4), $Eu_2O_3$ (up to 3), $Gd_2O_3$ (up to 0.25), $ThO_2$ (up to 2), $Sm_2O_3$ (up to 3).

The catalytically active layer within the present invention's oxide layer, according to TABLE I above, comprises:

i) respective oxides of aluminum, cerium, cobalt, lanthanum, manganese, nickel, and potassium;
ii) an oxide of at least one metal from a first group consisting of barium, copper, chromium, iron, molybdenum, niobium, tantalum, titanium, vanadium, tungsten, and zinc; and
iii) an oxide of at least one rare earth metal from a second group consisting of europium, gadolinium, neodymium, praseodymium, thorium, and samarium.

The supporting second carrier within the oxide layer defined by TABLE I above comprises:

i) oxides of metals selected from a group consisting of aluminum, manganese, vanadium, chromium, molybdenum, iron, tungsten, titanium, potassium, zinc, barium; and
ii) oxides of rare earth metals selected from a group consisting of lanthanum, cerium and yttrium.

The layer of the above composition catalyzes the following reactions:

$$CO + H_2O \rightarrow CO_2 + H_2 \quad (3)$$

$$C_nH_{2n+2} + 2nH_2O \rightarrow nCO_2 + (3n+1)H_2 \quad (4)$$

The hydrogen formed by reactions (3) and (4) is highly active, with a greater reduction electric potential than CO, and thus accelerates the $NO_x$ reduction process which occurs according to reaction (2). Consequently the non-noble metal catalyst of the present invention achieves a $NO_x$ reduction efficiency significantly greater than that of comparable noble metal catalysts, which reduce the $NO_x$ according to reaction (1).

The composite structure of the catalytically active layer comprises a mixture of solid compound phases within a mixture of individual metal oxide phases. Both stoichiometric and nonstoichiometric oxides, crystalline and an amorphous phases are present. The examples of solid compound are Spinel type crystal $AB_2O_4$, such as $CuCO_2O_4$, and Perovskite type crystal $ABO_3$, such as $LaMnO_3$ and $LaCoO_3$, where A and B are non-identical and are selected from a group consisting of aluminum, cerium, cobalt, lanthanum, manganese, nickel, potassium, barium, copper, chromium, iron, molybdenum, niobium, tantalum, titanium, vanadium, tungsten, zinc, europium, gadolinium, neodymium, praseodymium, thorium, and samarium. Also present within the composite structure are two metal component oxides formed by doping a mother crystal of a metal oxide with a trace impurity of another metal oxide are present, for example, $Mn_2O_3$ doped with $Fe_2O_3$. In specific, the mixture of the catalyzing layer within the oxide layer according to TABLE I above comprises a matrix of an individual phase oxide of at least one metal from a third group consisting of barium, copper, chromium, iron, molybdenum, niobium, tantalum, titanium, vanadium, tungsten, zinc, europium, gadolinium, neodymium, praseodymium, thorium, and samarium which surrounds oxides of aluminum, cerium, cobalt, lanthanum, manganese, nickel, and potassium, and surrounds a compound represented by a formula from the group of the above-identified $AB_2O_4$ and $ABO_3$.

The above described composite structure within the catalytically active layer serves to separate and "barricade" the catalytically active components which are susceptible to sintering and recrystallization by components which are temperature stable. These high thermal stability components are finely dispersed throughout the active catalyzing layer and tightly adhere to catalytically active components of less thermal stability. Examples of these stable barricading components include oxides of Ce, Cr, W, Y, etc., such as oxides of Ce formed with a network structure surrounding the active oxides of Cu, Co, Mn, etc., wherein the oxides of Cr form fine particles adhered to the catalytically active oxides of Cu, for instance. This "barricading" structure catalyst is unattainable by practical means in non-noble converters of prior art.

The above-described composite structure is attained by a controlled manufacturing process described in the Detailed Description of the Preferred Embodiment hereinbelow.

The inventors have conducted extensive emissions tests to evaluate the conversion efficiency of their non-precious metal catalyst. The tests involved an actual automobile and were conducted according to the standards of US EPA 87-FTP LA-4 test methods. The vehicle was selected on a random basis. The results are shown in Table II below:

TABLE II

| Configuration | HC (gm/mi) | CO (gm/mi) | $NO_x$ (gm/mi) |
|---|---|---|---|
| Without converter: | 5.690 | 25.227 | 0.462 |
| With present invention non-noble metal converter: | 0.538 | 4.844 | 0.074 |
| Conversion (%) | 90.5 | 80.8 | 84.0 |

The conversion efficiency results tabulated above, obtained from a randomly selected vehicle with over 8000 miles of road use, are comparable to the efficiency of precious metal catalysts.

DESCRIPTION OF PREFERRED EMBODIMENTS

The present invention will now be described in reference to a specific example.

The primary (of first) carrier in this example is a substrate of a monolithic ceramic material with a high pore volume (0.1–0.5 ml/gm).

To form a second carrier, the ceramic substrate (first carrier) is immersed in a solution containing, by indicated weight ratio, the following nitrate salts: 148.5 part of $Al(NO_3)_3 \cdot 3H_2O$, 2.61 part of $La(NO_3)_3 \cdot 6H_2O$, 50% solution of 4.31 part of $Mn(NO_3)_2$, and 0.662 of $Y(NO_3)_3 \cdot 6H_2O$ for 10 to 60 minutes at 10° C. to 30° C. The coated substrate is then dried for 2 hours at 120° C., to reduce moisture content to 0.2%. The metal salts are then calcined by baking at 400° C. to 600° C. for 4 to 10 hours. The calcining process produces a second carrier comprising oxides of the following respective weight ratios:

| Oxide: | $La_2O_3$ | $Al_2O_3$ | $Y_2O_3$ | $MnO_2$ |
|---|---|---|---|---|
| Weight ratio: | 1 | 30 | 0.2 | 1 |

Optional metal salts may be added to the solution to achieve other embodiments of the second carrier that contain oxides other than those used in the present example, in specific any from the group consisting of $Al_2O_3$, $V_2O_5$, $CeO_2$, $Cr_2O_3$, $MoO_3$, $La_2O_3$, $Y_2O_3$, $WO_3$, $MnO_2$, $Fe_2O_3$, $TiO_2$, $K_2O$, $ZnO$, and $BaO$. The weight percentage of the second carrier metallic oxides with respect to the entire carrier (first and second carriers together) can vary between 2–15%.

The substrate with its calcined second carrier, in this example, is then immersed in a solution containing, by indicated weight ratio, the following nitrate salts of rare earth and other non-noble metals: 2.61 part of $La(NO_3)_3 \cdot 6H_2O$, 3.03 part of $Ce(NO_3)_3 \cdot 6H_2O$, 50% solution of 17.24 part of $Mn(NO_3)_2$, and 1.03 part of $Cr(NO_3)_3 \cdot 6H_2O$ for 10 to 60 minutes at 10° C. to 30° C. The substrate with its calcined second carrier impregnated with the above solution in then dried for 2 to 4 hours at 100° C. to 110° C. After drying, the substrate is calcined in accordance with the temperature cycle tabulated below:

| Time (hours) | Step | Temperature (°C.) |
|---|---|---|
| 1 | 1 | 120 |
| 2 | 2 | 300 |
| 4 | 3 | 500 |
| 2 | 4 | 800 |

An alumina pellet substrate may be employed as an alternate first carrier for the catalyst of the above example. A usual range of pellet specific surface area is between 1 and $100 M^2/G$, with a pellet radius from 0.15 to 0.4 centimeters.

A brief description of the composite structure of the second carrier and active layer manufactured according to the above process is as follows:

In the second carrier, La and Y ion are doped into an $\gamma$-$Al_2O_3$ crystalline structure thus decreasing the ionic mobility of $\gamma$-$Al_2O_3$. This yields a structure that is resistant to sintering and phase transformation recrystallization.

In the catalytically active layer, the oxides of Mn and Ce are the main catalytically active ingredient, those fine particles are separated by the surrounding oxide of Cr, and barricaded by a network structure of oxide of Ce. At the same time, solid compounds of La such as $LaMnO_3$, are formed, which are more thermally stable than oxides of Mn.

The non-precious metal catalyst in this invention is capable of operating at temperatures of up to 1000° C. without deterioration. The meltdown temperature of the ceramic substrate is 1450° C. (2642° F.). The normal operating temperature range of the catalyst is between 250° C. and 800° C. The minimum temperature for catalyst light-off is 150° C.

It is to be noted that the non-precious metal catalyst forming process as described hereinabove can be applied to any standard ceramic substrate. The preferable pore volume of the substrate is 0.2 to 0.5 ml/gm.

The present invention has been described in reference to the preferred embodiment hereinabove. However, variations within the spirit and scope of the present invention will become obvious to those skilled in the art. The proportional ranges of metal oxides and rare earth oxide mixtures have been given which in the present invention have shown maximum catalytic efficiency to exist. The specific proportional mix within the disclosed ranges which provides maximum sought-after characteristics will depend on the nature of the specific requirement. Also, the manufacturing process described herein serves as an example and nothing more. Alternate manufacturing methods to achieve the metal oxide and metal oxide-rare earth oxide mixture of the present invention will become obvious to those skilled in the art. Furthermore, alternate carrier materials of the disclosed porosity will become obvious as technology advances.

We claim:

1. A catalyst for removal of carbon monoxide, hydrocarbons, and nitrogen oxides from exhaust gases, comprising:
   a first carrier means;
   a second carrier means, formed on said first carrier means, comprising
   an oxide of a metal selected from the group consisting of aluminum, manganese, vanadium, chromium, molybdenum, iron, tungsten, titanium, potassium, zinc, barium and mixtures thereof, and
   an oxide of a metal selected from the group consisting of lanthanum, cerium, yttrium and mixtures thereof;
   a catalyzing layer, formed on said second carrier, comprising a mixture of:
   i) oxides of aluminum, cerium, cobalt, lanthanum, manganese, nickel, and potassium;
   ii) an oxide of a metal selected from the group consisting of barium, copper, chromium, iron, molybdenum, niobium, tantalum, titanium, vanadium, tungsten, zinc and mixtures thereof; and
   iii) an oxide of a metal selected from the group consisting of europium, gadolinium, neodymium, praseodymium, thorium, samarium and mixtures thereof.

2. A catalyst for removal of carbon monoxide, hydrocarbons, and nitrogen oxides from exhaust gases, comprising:

a first carrier means;

a second carrier means, formed on said first carrier means, comprising an oxide of a metal selected from the group consisting of aluminum, manganese, vanadium, chromium, molybdenum, iron, tungsten, titanium, potassium, zinc, barium, lanthanum, cerium, yttrium and mixtures thereof;

a catalyzing layer, formed on said second carrier means, comprising a mixture of individual phases of oxides of at least one metal from the group consisting of barium, copper, chromium, iron, molybdenum, niobium, tantalum, titanium, vandium, tungsten, zinc, europium, gadolinium, neodymium, praseodymium, thorium, samarium, or mixtures thereof, which surround an oxide of at least one metal selected from the group consisting of aluminum, cerium, cobalt, lanthanum, manganese, nickel, and potassium, or mixtures thereof, or which surround a compound, wherein the compound is a Spinel or a Perovskite crystal compound, said Spinel and said Perovskite crystal compound being formed of a first metal and a second metal, said first and second metal being selected from the group consisting of aluminum, cerium, cobalt, lanthanum, manganese, nickel, potassium, barium, copper, chromium, iron, molybdenum, niobium, tantalum, titanium, vanadium, tungsten, zinc, europium, gadolinium, neodymium, praseodymium, thorium, and samarium.

3. A catalyst for removal of carbon monoxide, hydrocarbons, and nitrogen oxides from exhaust gases, comprising:

a first carrier means;

a second carrier means, formed on said first carrier means, consisting essentially of:

oxides of aluminum manganese, lanthanum, and yttrium;

a catalyzing layer, formed on said second carrier, consisting essentially of a mixture of:

oxides of manganese, cerium, lanthanum, and chromium.

4. A catalyst as in any one of claim 1, 2 or 3 wherein said first carrier means includes a porous monolithic ceramic substrate with a pore volume ranging from 0.1–0.5 ml/gm.

5. A catalyst as in any one of claim 1, 2 or 3 wherein said first carrier means consists of alumina pellets which have a surface to weight ratio of between approximately 1 and 100 square meters per gram.

* * * * *